United States Patent
Strowitzki et al.

(12) 
(10) Patent No.: US 6,522,679 B1
(45) Date of Patent: *Feb. 18, 2003

(54) GAS LASER DISCHARGE UNIT

(75) Inventors: Claus Strowitzki, Gilching (DE); Hans Kodeda, Landshut (DE)

(73) Assignee: TuiLaser, Germering (DE)

( * ) Notice: Subject to any disclaimer, the term of this patent is extended or adjusted under 35 U.S.C. 154(b) by 0 days.

This patent is subject to a terminal disclaimer.

(21) Appl. No.: 09/510,539

(22) Filed: Feb. 22, 2000

(51) Int. Cl.$^7$ ................................................ H01S 3/097
(52) U.S. Cl. .......................... 372/87; 372/55; 372/61; 372/51; 372/87; 372/59; 372/60; 372/82; 372/81
(58) Field of Search ............................ 372/55, 61, 57, 372/87, 60, 82, 81

(56) References Cited

U.S. PATENT DOCUMENTS

| | | | |
|---|---|---|---|
| 3,400,596 A | | 9/1968 | Laich ........................ 74/89.23 |
| 3,753,144 A | * | 8/1973 | Kearns et al. ................. 372/35 |

(List continued on next page.)

FOREIGN PATENT DOCUMENTS

| | | | |
|---|---|---|---|
| DE | 31 30 399 A1 | 2/1983 | |
| DE | 32 12928 C2 | 10/1983 | |
| DE | 37 10 525 C2 | 10/1987 | |
| DE | 3718467 A | 12/1988 | ........... H01S/3/086 |
| DE | 297 15 466 U1 | 10/1997 | |
| DE | 198 40 035 A1 | 4/1999 | |
| EP | 0456875 A | 11/1991 | ........... H01S/3/086 |
| FR | 2698496 A | 5/1994 | |
| JP | 2250383 | 10/1990 | ........... H01S/3/086 |
| JP | 05067823 | 3/1993 | |
| JP | 5152643 A | 6/1993 | ........... H01S/3/034 |
| JP | 06237034 | 8/1994 | |
| JP | 298229 | * 1/2001 | |
| WO | WO9960674 A | 11/1999 | |

OTHER PUBLICATIONS

Kodeda, et al., "Adjustable Mounting Unit for an Optical Element of a Gas Laser," US Application 09/511,648 filed Feb. 22, 2000 (Status: pending).

Kodeda, et al., "An Optical Element Holding and Extraction Device," US Application 09/510,666 filed Feb. 22, 2000 (Status: pending).

Kodeda, et al.., "A Gas Laser and a Dedusting Unit Thereof," US Application 09/511,649 filed Feb. 22, 2000 (Status: pending).

Strowitzki, "Dedusting Unit for a Laser Optical Element of a Gas Laser and Method For Assembling," US Application 09/510,667 filed Feb. 22, 2000 (Status: pending).

Strowitzki, et al., "Shadow Device for a Gas Laser," US Application 09/510,017 filed Feb. 22, 2000 (Status: pending).

Strowitzki, et al., "Modular Gas Laser Discharge Unit," US Application 09/510,538 filed Feb. 22, 2000 (Status: pending).

*Primary Examiner*—Paul Ip
*Assistant Examiner*—Delma R. Flores Ruiz
(74) *Attorney, Agent, or Firm*—Barry J. Marenberg; Ivor R. Elrifi; Mintz, Levin, Cohn, Ferris, Glovsky and Popeo, P.C.

(57) ABSTRACT

A gas laser discharge unit is provided. The discharge unit includes an elongated electrode plate having a plurality of spaced-apart holes therein and a plurality of coaxial high voltage ducts. Each duct extends through one of the holes in the electrode plate and includes a central conductive core and an insulator element arranged around the core to electrically insulate said core from the electrode plate. An elongated high voltage electrode is electrically connected to the cores of the ducts. In addition, an elongated ground electrode is positioned to oppose the high voltage electrode and form a gas discharge gap therebetween. The ground electrode is electrically connected to the electrode plate. The gas laser discharge unit may be removably mounted as a module into a gas laser tube, such as an excimer laser tube.

39 Claims, 4 Drawing Sheets

U.S. PATENT DOCUMENTS

| | | | |
|---|---|---|---|
| 3,877,794 A | 4/1975 | Kulle et al. | 350/187 |
| 3,886,474 A | 5/1975 | Hensolt et al. | 372/107 |
| 4,423,510 A * | 12/1983 | Pack et al. | 372/56 |
| 4,448,385 A | 5/1984 | Matthys | 248/476 |
| 4,534,034 A | 8/1985 | Hohla et al. | 372/59 |
| 4,541,848 A | 9/1985 | Masuda et al. | 361/235 |
| 4,638,486 A | 1/1987 | Dost et al. | 372/107 |
| 4,686,685 A * | 8/1987 | Hoag | 372/107 |
| 4,744,091 A | 5/1988 | Gorisch et al. | 372/107 |
| 4,746,201 A | 5/1988 | Gould | 350/394 |
| 4,769,824 A | 9/1988 | Seki | 372/107 |
| 4,891,818 A | 1/1990 | Levatter | 372/57 |
| 5,268,923 A | 12/1993 | Welsch et al. | 372/107 |
| 5,319,663 A | 6/1994 | Reid et al. | 372/59 |
| 5,373,523 A | 12/1994 | Fujimoto et al. | 372/103 |
| 5,438,587 A | 8/1995 | Kinley | 372/86 |
| 5,473,162 A | 12/1995 | Busch et al. | 250/339.08 |
| 5,585,641 A * | 12/1996 | Sze et al. | 250/492.1 |
| 5,591,317 A | 1/1997 | Pitts, Jr. | 204/667 |
| 5,729,564 A | 3/1998 | Cullumber | 372/58 |
| 5,748,663 A | 5/1998 | Chenausky | 372/55 |
| 5,771,258 A | 6/1998 | Morton et al. | 372/57 |
| 5,857,775 A | 1/1999 | Vodzak et al. | 374/121 |
| 6,018,537 A * | 1/2000 | Hofmann et al. | 372/102 |
| 6,151,346 A * | 11/2000 | Partlo et al. | 372/38.02 |
| 6,192,061 B1 | 2/2001 | Hart et al. | 372/107 |
| 6,208,674 B1 * | 3/2001 | Webb et al. | 372/55 |
| 6,359,922 B1 * | 3/2002 | Partlo et al. | 372/57 |
| 6,363,094 B1 * | 3/2002 | Morton et al. | 372/58 |

* cited by examiner

GAS LASER DISCHARGE UNIT

BACKGROUND OF THE INVENTION

1. Field of the Invention

The present invention relates to gas lasers, and more particularly to a discharge unit for a gas laser, wherein a high voltage is supplied to two discharge electrodes.

2. Background Of The Invention

Excimer lasers provide high intensity laser radiation in the ultraviolet spectral range. This makes them important tools especially for medical and surgical applications as well as for other industrial applications.

Excimer lasers are gas discharge lasers that use a rare gas such as argon and a halide gas such as fluor (for example ArF excimer laser) or a gas containing a halide (for example $F_2$) as the laser gas.

Generally, in an excimer laser a gas mixture containing the active component and other gases is steadily provided to a discharge gap between a pair of elongated electrodes inside the laser tube by means of a fan or the like. A high voltage applied between the two electrodes causes a gas discharge in said discharge gap, whereby, from the active component of the gas, short-lived excited-state molecules are generated, whose dissociation generates ultraviolet radiation constituting the laser radiation. To increase the homogeneity of the gas discharge, in present excimer lasers a pre-ionization of the laser gas by pre-ionizers is used. As the used laser gas needs to regenerate before it can be re-used, excimer lasers are generally operated in a pulsed operation mode, wherein the laser gas in the discharge gap is being steadily replaced by fresh or regenerated laser gas provided by the fan.

The discharge electrodes for an excimer laser are usually located inside the laser tube.

The housing of an excimer laser generally consists of a metal tube having openings in a cylindrical wall on the upper side thereof. An insulating plate covers the open upper side. The metal tube and one of the discharge electrodes are grounded. A high voltage is applied to the second discharge electrode via a HV duct extending through the insulating plate.

One main problem of excimer lasers, which is still not satisfactorily solved, is the contamination of the laser gas due to the corrosive effect of the active components of the laser gas on many insulating materials which are widely used as insulators, especially on materials containing carbon molecular structures, such as many plastic materials, for example TEFLON®. Due to this contamination the lifetime of the laser gas is reduced, which makes a frequent exchange of the laser gas necessary. To overcome this problem, U.S. Pat. No. 4,891,818 utilizes high-purity aluminum oxide ($Al_2O_3$) as insulator, on which the corrosive effect of the active components of the laser gas is by far reduced as compared to plastic materials.

Another, even more corrosion resistant, class of materials that can be used as insulators is fluorides.

Directly related to the above problem is the problem, that exchanging of the gas and maintenance works are expensive and time-consuming. Moreover, they are hazardous activities, as the laser gases for excimer lasers are, besides their corrosive nature, highly toxic.

A further problem is to provide an excimer laser with a high pulse repetition rate. U.S. Pat. No. 5,771,258 discloses an aerodynamic chamber design for an excimer laser to provide a high pulse repetition rate. A high repetition rate also requires a high frequency voltage to be efficiently applied to the electrodes, which becomes more difficult with increasing frequency of the voltage.

RELATED APPLICATIONS

The present invention may be used in conjunction with the inventions described in the patent applications identified below and which are being filed simultaneously with the present application:

| Docket No. | Title | Inventors | Filing Date | Serial or Pat. No. |
|---|---|---|---|---|
| 249/301 | A Gas Laser and a Dedusting Unit Thereof | Hans Kodeda, Helmut Frowein, Claus Strowitzki, and Alexander Hohla | Feb. 22, 2000 | 09/511,649 |
| 249/302 | Dedusting Unit for a Laser Optical Element of a Gas Laser and Method for Assembling | Claus Strowitzki | Feb. 22, 2000 | 09/510,667 |
| 249/303 | Shadow Device for A Gas Laser | Claus Strowitzki and Hans Kodeda | Feb. 22, 2000 | 09/510,017 |
| 249/304 | Modular Gas Laser Discharge Unit | Claus Strowitzki and Hans Kodeda | Feb. 22, 2000 | 09/510,538 |
| 250/001 | Adjustable Mounting Unit for an Optical Element of a Gas Laser | Hans Kodeda, Helmut Frowein, Claus Strowitzki, and Alexander Hohla | Feb. 22, 2000 | 09/511,648 |
| 250/002 | An Optical Element Holding and Extraction Device | Hans Kodeda and Helmut Frowein | Feb. 22, 2000 | 09/510,666 |

All of the foregoing applications are incorporated by reference as if fully set forth herein.

SUMMARY OF THE INVENTION

One object of the present invention is to provide a laser discharge unit for a gas laser and in particular for an excimer laser, which minimizes contamination of the laser gas and thus increases the lifetime of the laser gas.

A further object of the invention is to provide a laser discharge unit for a gas laser that allows a high frequency voltage to be efficiently applied to the discharge electrodes.

Another object of the present invention is to provide a laser discharge unit for a gas laser and in particular for an excimer laser which is easy to handle and yet powerful.

The above and further objects of the invention are achieved by a laser discharge unit with an elongated electrode plate made of an electrically conductive material, such as metal, a plurality of waveguide-like coaxial high voltage ducts extending through said electrode plate and comprising respectively a central conductive core and an insulator element made of an insulator, such as a ceramic insulator, and being arranged around said core and electrically insulating said core from said electrode plate, an elongated high voltage electrode and an elongated ground electrode, said high voltage electrode being electrically connected to said cores of said ducts and said ground electrode being electrically connected to said electrode plate, wherein said ducts are arranged spaced apart from each other.

The tube of the laser is preferably electrically connected to the ground electrode, and both are preferably grounded.

The electrode plate of the discharge unit of the present invention comprises a metal plate, preferably a pure metal plate. An advantage of this is that the laser gas does not corrode the electrode plate to the same extent as it would corrode if it were made from an insulator material such as ceramic; thus contamination of the laser gas is reduced.

The electrode plate comprises a plurality of holes, through each of which one of the high voltage ducts is guided. As the electrode plate is grounded, an insulator is required between the conductive cores of the HV ducts and the electrode plate. The number of high voltage ducts (and holes) depends on the size of the laser, in particular on the length of the electrodes. For example, for a typical excimer laser, three high voltage ducts should be used. For a larger laser with longer electrodes more than three ducts should be provided. For smaller lasers with shorter electrodes only one or two ducts may be provided.

According to the invention, the conductive cores of the ducts are respectively surrounded by an insulator element. By this construction, as compared to a whole plate made of an insulator, only a small amount of insulator material is in contact with the laser gas. Thus the contamination of the laser gas is clearly reduced.

The conductive cores of the ducts and the electrode plate form a coaxial waveguide-like structure, which facilitates the effective coupling of high frequency pulses for pulsed operation mode of the laser to the high voltage electrode.

The insulator elements of the ducts are preferably made of an insulating material, such as aluminum oxide ($Al_2O_3$). Alternatively, the insulator elements can be made from a fluoride material. In this regard, the more expensive fluoride materials, which are more resistant against corrosion by the excimer laser gas, can be used since the amount of insulator material has been reduced to a minimum according to the invention.

In principle the insulator elements may have any shape. Preferably the shape of the insulator elements is such that they conically expand towards said high voltage electrode and comprise a corrugated surface, so as to increase a creepage path extending along said surface. This shape is intended to prevent surface flashover between the high voltage electrode and the grounded electrode plate.

Preferably the electrode plate carries the high voltage ducts in that the ducts are mounted to the electrode plate by a plurality of screws. Alternatively the ducts can be mounted to the tube of the laser, for example by screws or by rods or plates or the like.

The laser discharge unit preferably further comprises a sleeve enclosing the core and insulator of each duct. Each sleeve preferably includes an inner end supported by the electrode plate, and an outer free end. Each core includes an inner end connected to the high voltage electrode plate and a threaded outer free end extending beyond the free end of the sleeve. A nut or other fastening means may be screwed onto the threaded end so as to press the sleeve against the electrode plate and thereby tension the core by pulling it. As those skilled in the art will recognize, any other construction for fixing the high voltage ducts to the electrode via the core or via the insulator element is possible as well. Preferably a stud which comprises a thread at both of its ends, such as a threaded bolt, is used to connect the inner end of the core to the high voltage electrode. Alternatively to the above described construction the high voltage electrode can be carried by, or mounted to, the laser tube, for example via a plurality of plates or rods made of an insulating material that are screwed to the tube.

The core and the insulator of each duct are preferably fixed with respect to each other; this may be accomplished, for example, by providing the inner end of each core with a core ring shoulder pressed against the insulator by the tensioned core. A seal is preferably provided between the ring shoulder and the insulator. It is also possible, however, for the core to include a recess into which a ring shoulder of the insulator may be inserted. Alternatively, the core and the insulator may be fixed with respect to each other by some different construction.

The insulator element may be pressed against the electrode plate by means of the tensioned core via the core ring shoulder at the inner end of the core and an insulator ring shoulder of the insulator element. Preferably, a seal is provided between the insulator shoulder and the electrode plate.

A sealing ring also preferably surrounds each sleeve. The sealing ring should have at its outer circumference a flange that is supported by an outer rim of a hole in the tube through which the respective high voltage duct is inserted. The electrode plate may also be provided with a ring shoulder supported at an inner rim of the tube. The ring and the electrode plate may then be connected, for example, by screws. A seal is preferably provided between the electrode plate shoulder and the inner rim of the tube.

The ground electrode is preferably carried by, or mounted to, the electrode plate. Preferably a plurality of flow guides is used for this purpose. The flow guides are preferably made from sheets of metal that extend between the electrode and ground electrode in a plane perpendicular to the longitudinal axis of the electrodes. The flow guides typically comprise an upper flange, a lower flange, and a central flow-guiding portion integrally connecting the upper flange to the lower flange. The upper and lower flanges extend perpendicular to each other and to the central flow-guiding portion. The upper flange is attached to a side face of said electrode plate, and the lower flange is attached to a bottom face of the ground electrode. Preferably the central flow-guiding portion is aerodynamically profiled in order to minimize flow resistance and turbulences for maintaining a substantially laminar gas flow between the flow guides.

Alternatively, the laser tube can carry the ground electrode, for example via a plurality of plates or rods or the like made of metal or some other conductive material.

Preferably a gas-tight seal is provided between the ducts and the electrode plate. Alternatively a seal can be provided outside the laser tube, for example at the end of the ducts. For practical reasons the holes in the electrode plate and the ducts preferably have a round cross-section. In this case, the gas-tight seals are ring-shaped. The holes can just as well have a square, a rectangular, an oval, an oblong or any other cross-section. As would be apparent to those skilled in the art, the ducts and the gas-tight seals should have a corresponding shape. But ring-shaped seals have the advantage that they are easier to fabricate and to handle, more reliable, and furthermore they are cheaper than for example rectangular seals. On the other hand it is preferred that a metal seal is used. If a ring-shaped seal is used, a commercial metal seal can be used.

It is preferred that the ducts are inserted into the electrode plate respectively with a defined tolerance between the insulator element and the respective hole in the electrode plate through which the respective duct is inserted. In this manner, the ducts are held fixed in a defined position. According to an alternative embodiment of the invention this fixing can be achieved solely by fixing elements, such as bolts or screws or a tube, by which the respective duct is held in its hole in a fixed position.

The preferred discharge unit further comprises a pair of standard corona pre-ionizers, that is a pair of elongated cylindrical pre-ionizers with a conductive core and a surrounding tube-shaped insulator. The pre-ionizers extend substantially parallel along opposite sides of the electrode. The insulator of the pre-ionizers is preferably a ceramic material such as alumina. It can also be a fluoride material. Alternatively, any other kind of known pre-ionizer can be used. The pre-ionizers are not necessary for the discharge unit to work. Indeed, excimer lasers were known before the invention of pre-ionizers. Pre-ionization, however makes the gas discharge between the high voltage electrode and the ground electrode more homogeneous and thus more reliable.

A shadow plate may be mounted between the gas discharge gap and the insulator for protection of the insulator against the laser radiation and discharge light irradiated from the gas discharge gap, and against light from the pre-ionizers.

The overall construction of the laser can be such that first a laser tube is provided, and then the high voltage electrode, the ground electrode, the insulator element or elements, the high voltage conductor or conductors and the pre-ionizers are mounted to the tube, one by one. It is preferred, however, that the electrode arrangement is a pre-mounted module-type discharge unit, wherein the electrodes, the shadow plate, and the high voltage ducts are pre-mounted independently of other laser elements. The discharge unit may be mounted to the laser tube as a whole. This provides several advantages. One advantage is that the gas discharge gap between the high voltage electrode and the ground electrode can be adjusted before the discharge unit is mounted into the laser tube. This facilitates an accurate adjustment of the gas discharge gap. Furthermore the construction of the laser can be done in a more efficient manner.

The laser gas can, in the case of an excimer laser, be any excimer laser gas, such as KrF, ArF, XeF, XeBr, HgBr, HgCl, XeCl, HCl, $F_2$, $Ar_2$ and the like or any laser gas in case of some other gas discharge laser.

Besides the laser gas, a buffer gas comprising a mixture of Helium, Neon and/or Argon is preferably provided in the tube.

Further features and advantages will become apparent from the following detailed description of the preferred embodiment of the invention when read in combination with the drawings.

BRIEF DESCRIPTION OF THE DRAWINGS

FIG. 3b shows a front view of the discharge unit of FIG. 3a;

FIG. 3c shows a plan view of the discharge unit of FIG. 3a;

DETAILED DESCRIPTION OF THE PREFERRED EMBODIMENT

In the following a preferred embodiment of the invention will be set forth.

Figure 1:
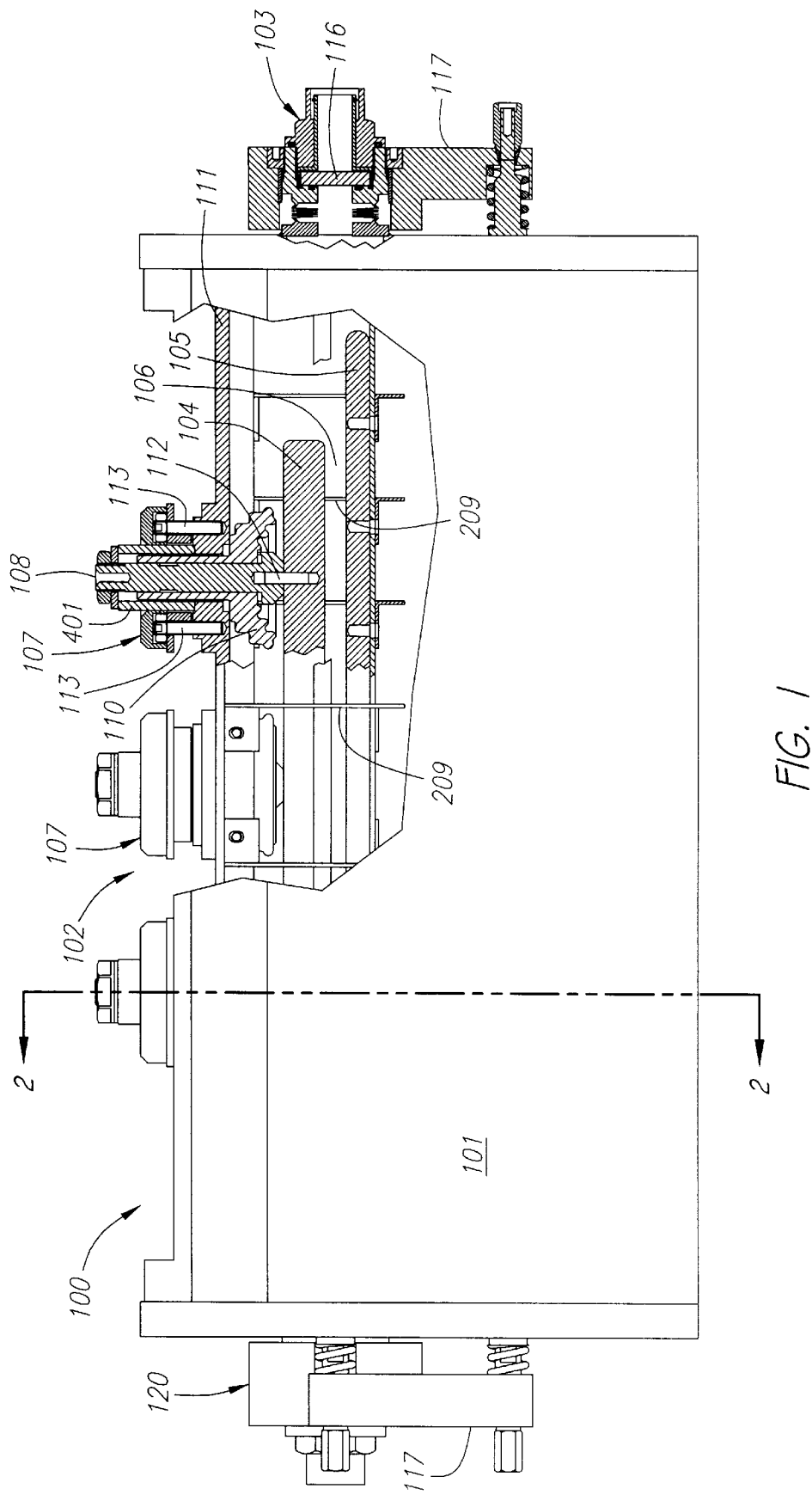
FIG. 1 is a partial cut-away side view of an excimer laser according to a preferred embodiment of the invention.
Figure 2:
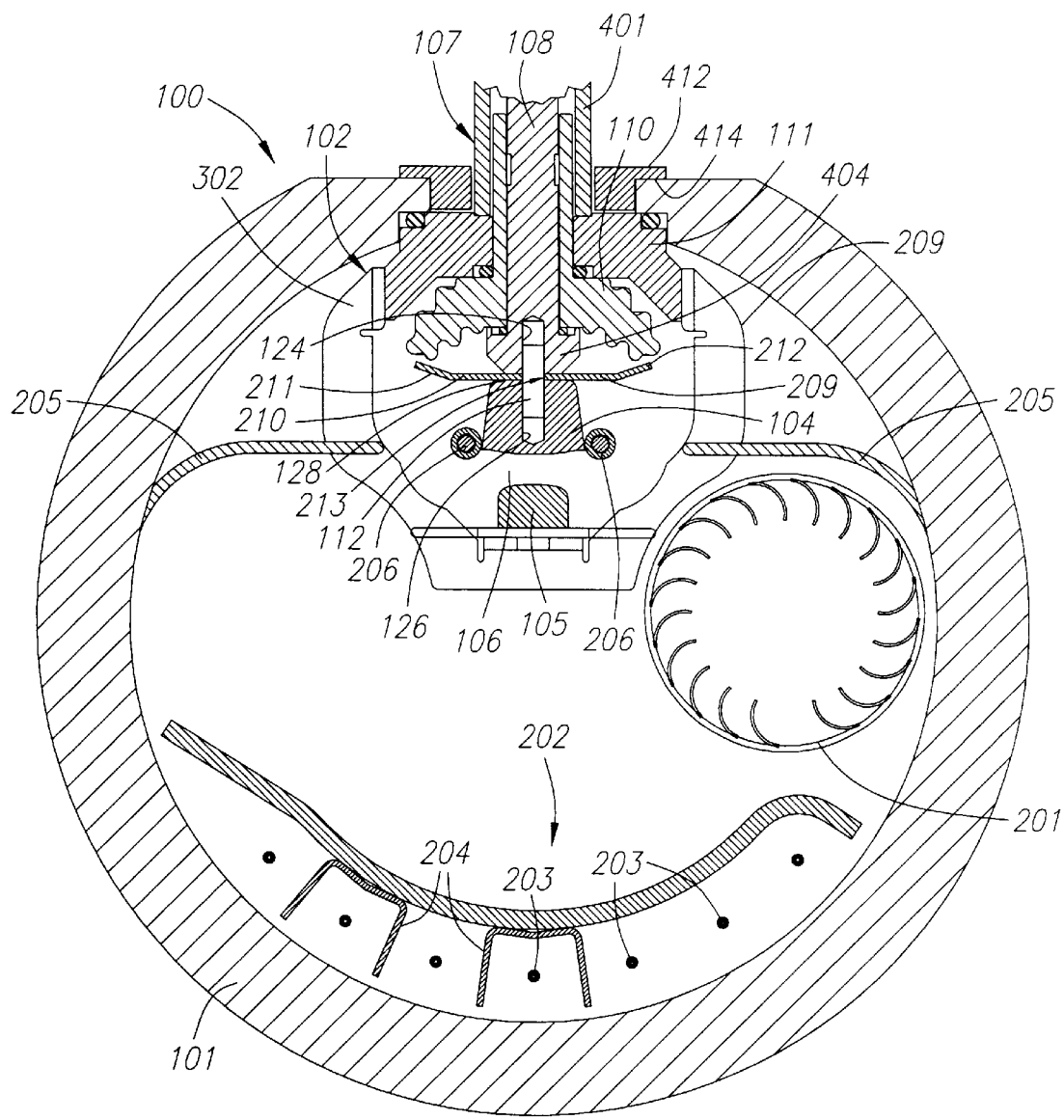
FIG. 2 is a cross-sectional view of the excimer laser in FIG. 1 along Line 2—2.

FIGS. 1 and 2 show an excimer laser 100 comprising a tube 101, a discharge unit 102, a circulation means 201, and a laser optical system 103. As is known in the art, gas laser 100 may also comprise means for cooling the laser gas, such as a gas cooler, within laser tube 101.

The circulation means 201 is optional and may comprise, for example, a fan or any other means known for circulating lasing gases in gas lasers.

The discharge unit 102 is mounted into the tube 101 and comprises a high voltage electrode 104 and the ground electrode 105. The high voltage electrode 104 and the ground electrode 105 are spaced apart from each other, thereby defining a gas discharge gap 106. A high voltage is applied to the high voltage electrode 104 via a plurality of high voltage ducts 107, which carry the high voltage electrode 104. Each high voltage duct 107 comprises a conductive core 108 and an insulator element 110 arranged around the conductive core 108. Each high voltage duct 107 is attached to the high voltage electrode 104. The high voltage ducts may be attached to the high voltage electrode using any suitable fastener. In the present embodiment, a double threaded stud 112 is used to attach electrode 104 to each conductive core 108 of each duct 107.

Furthermore, discharge unit 102 is provided with an elongated electrode plate 111. The electrode plate 111 includes holes, through which the high voltage ducts 107 extend so as to be connected to the high voltage electrode 104. Each high voltage duct 107 is fixed to the electrode plate 111 by an attachment means, such as bolts 113. Those skilled in the art will appreciate, however, that any suitable attachment means may be used to fix ducts 107 to electrode plate 111.

The insulator elements 110 are preferably made of a ceramic material. Optionally, however, they may be made from other insulative materials, including, for example, a fluoride material. They preferably have a shape that conically expands towards the high voltage electrode 104 and comprise a corrugated surface, so as to increase a creepage path extending along said surface. This helps to prevent surface flashover between the high voltage electrode 104 and the grounded electrode plate 111.

As noted above, insulator elements 110 may be made from fluoride insulator material. These materials have the drawback of being relatively expensive. However, according to the preferred embodiment of the present invention, only a small amount of insulator material is required. Accordingly, the use of fluoride insulator materials is affordable in the present invention.

As illustrated in FIG. 2, discharge unit 102 also preferably comprises a shadow plate 210 disposed between the gas discharge gap 106 and the insulator element 110 for protecting the insulator element 110 against the corrosive effect of the laser gas and of the laser radiation. Shadow plate 210 is preferably made out of a metal, such as aluminum.

In the present embodiment, shadow plate 210 is interposed between the high voltage electrode 104 and insulator element 110 of the ducts 107. Preferably shadow plate 210 extends along the entire gas discharge gap 106 and is mounted in such a manner that it at least partially shields the insulator element against the laser radiation irradiated from the gas discharge gap 106.

Figure 3B:
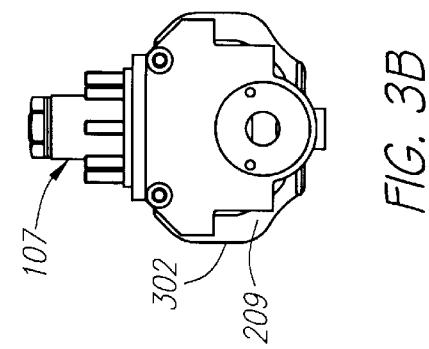
Figure 3A:
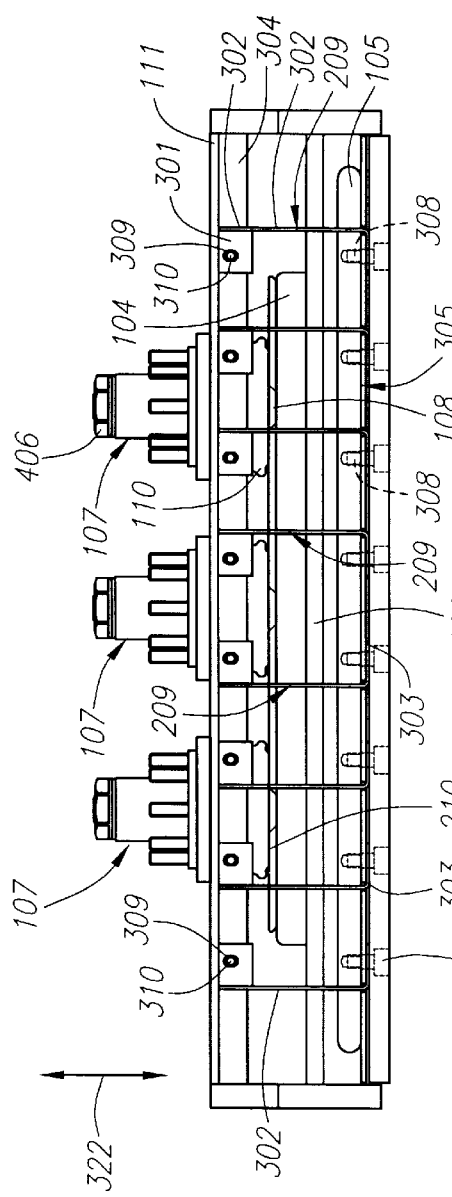
FIG. 3a shows a side view of a discharge unit according to a preferred embodiment of the invention.

Referring to FIGS. 2 and 3a, shadow plate 210 preferably has an elongated sheet-like shape and comprises a central portion 209, a first edge portion 211 and a second edge portion 212. The central portion 209 extends longitudinally in a direction parallel to the gas discharge gap 106 and perpendicular to the cores 108 of the high voltage ducts 107. The edge portions 211 and 212 are located at the longitudinal edges of the shadow plate 210 and are, with respect to the central portion 209, preferably bent towards the insulator elements 110 by a small angle of about 20 degrees. Although shadow plate 210 is preferably elongated as described above, it may have a variety of other shapes as well. For example, a plurality of shadow plates 210 could be used instead of one elongated shadow plate that extends the length of the discharge gap. In such a case, the shadow plates would preferably be circular and have a cross-sectional appearance consistent with that shown in FIG. 2. Thus, a circular shadow plate 210 could be interposed between the electrode 104 and each insulator element 110 of the high voltage ducts 107.

The type of laser gas employed may also affect the shape of the shadow plate 210. The reason for this is that some laser gases have a substantially lower breakdown voltage than other laser gases. For example, the laser gases used in ArF and KrF excimer lasers have a substantially lower breakdown voltage than the $F_2$ gas used in fluorine gas lasers. Thus, if laser 100 is a fluorine gas laser, then the shadow plate 210 may come much closer to the insulator element 110 than if laser 100 is an ArF or KrF excimer laser. As a result, bending the edges of the shadow plate 210 toward insulator element 110 may be appropriate. On the other hand, bending the edges of shadow plate 210 toward the insulator element for other excimer lasers may be inappropriate. Indeed, for example, with ArF, KrF, and other excimer lasers employing laser gases with relatively low breakdown voltages, it may be advantageous to bend the edges of the shadow plate away from the insulator element 110 to help ensure that current does not jump the gap between the shadow plate and insulator element. However, this of course, will depend on how far the shadow plate 210 is spaced from the insulator element 110 and the breakdown voltage of the laser gas being used. Similarly, the greater the breakdown voltage of the laser gas, the smaller the diameter of the conical portion of the insulator element 110 may be.

As best seen in FIG. 2, the shadow plate 209 may be interposed between the high voltage electrode 104 and inner ends 404 of the cores 108 of the high voltage ducts 107 so that the longitudinal axis of the central portion 209 (or center in the case of a circular shadow plate) coincides with the central axis of the high voltage electrode 104.

Although shadow plate 210 is preferably interposed between high voltage electrode 104 and inner ends 404 of the cores 108 as illustrated in FIG. 2, as those skilled in the art will appreciate, the shadow plate 210 will serve its desired function so long as it is interposed between the discharge gap 106 and insulator elements 110. Thus, the positioning of shadow plate 210 is not limited to the position illustrated in FIG. 2.

Shadow plate 210 may be interposed between electrode 104 and cores 108 by providing central portion 209 with a plurality of holes 213, preferably along the longitudinal axis of the central portion 209, and then attaching high voltage electrode 104 to the cores 108 through holes 213 using a suitable fastener. Thus, the spacing and the number of holes 213 correspond to the spacing and the number of high voltage ducts 107. In the present embodiment, stud bolts 112 with threads on both ends are used to attach electrode 104 to cores 108. One end of the stud bolts 112 is inserted into a threaded hole 124 provided in the respective core 108. The second end of the stud bolts 112 is inserted into a further threaded hole 126 provided in the mating face 128 of the high voltage electrode 104 that faces the inner end 404 of core 108 and the shadow plate 210. If a circular shadow plate is used, each shadow plate will be provide with a single hole 213 in the center of the shadow plate and one shadow plate will be used for each high voltage duct employed in the laser.

The shadow plate 210 preferably has a flow-guiding shape to help guide the lasing gas mixture into the gas discharge gap 106.

A preferred manner of assembling the electrode arrangement of the present invention with the shadow plate is now described.

First one end of a stud bolt 112 is screwed into each of the threaded holes provided on the mating face 128 of the high voltage electrode 104, such that the other end of each stud bolt 112 stands out of the mating face 128. Then the shadow plate 210 is arranged on the mating face 128 of the high voltage electrode 104 so that the stud bolts 112 are inserted into the holes 213 in the shadow plate 210. Alternatively, if a circular shadow plate is used, then one shadow plate 210 will be inserted over each of the stud bolts 112. After the shadow plate 210 is in place, a core 108 of the high voltage ducts 107 is lowered upon the shadow plate 210 such that the end of one of the stud bolts protruding from the electrode partially enters the threaded hole 124 provided in the inner end 404 of the core 108 of the high voltage duct 107. Subsequently the core 108 is rotated around its longitudinal axis, i.e. around the longitudinal axis of the stud bolt 112, so as to screw the core 108 onto the stud bolt 112. As a result, the core 108 is lowered onto the shadow plate 210, and the shadow plate 210 is finally held between the upper face 128 of the high voltage electrode 104 and the inner end 404 of the core 108. Additional high voltage ducts 107 comprising cores 108 are attached to the remaining stud bolts 112 in the same way as described above.

In the case of an elongated shadow plate, before the cores 108 are tightly screwed to the stud bolts 112, at least two of the cores 108 are loosely screwed to their corresponding stud bolt 112. Then, after the shadow plate 210 is correctly positioned, all of the cores 108 are screwed down tightly to lock shadow plate 210 in place.

The excimer laser 100 may be, for example, a pulsed fluorine gas ($F_2$) excimer laser with a wavelength of about 157 nanometers. This means that fluorine gas is used for generating the laser beam. However, as those skilled in the art will appreciate, any of the known excimer laser gases may be used in connection with the present invention.

By applying a high voltage pulse on the order of 20 kV to the high voltage electrode 104, the laser gas (e.g., fluorine gas) and additionally helium and/or argon gas as a buffer gas in the discharge gap 106 generate a laser beam which is emitted through the laser optical system comprising a front optical system 103 and a rear optical system 120.

Laser 100 typically further comprises a front optical element 116, through which the laser beam emits. Optical element 116 may be provided, for example, in an optical system 103 that includes an adjustable mounting means 117 for adjusting the position of the optical element 116 in relation to the tube 101. Rear laser optical system 120 similarly includes an optical element 116 (not shown) and adjusting means 117. However, the optical element 116 of the rear laser optical system 120 comprises a totally reflective mirror rather than a partially reflective mirror. As those skilled in the art will appreciate, front and rear optical elements 116 may also be mounted directly in the end walls of the laser tube 101. Alternatively, they may be mounted on adjustable mounting brackets that are separate from the laser tube 101 as is known in the art. A suitable laser optics system and an adjustable mounting means for use in connection with the present invention as front and rear optical systems 103, 120 are described in concurrently filed applications Ser. No. 09/511,648 and 09/510,666, which are hereby incorporated by reference. The filing details of these applications are provided above.

FIG. 2 is a cross-sectional view along line 2—2 of the excimer laser 100 shown in FIG. 1. As can be seen in FIG. 2, the excimer laser 100 preferably further includes a circulating means 112, such as a fan, for circulating the excimer laser gas through the discharge gap 106 and an optional dedusting unit 202 for dedusting the gas flow through the tube 101. The dedusting unit comprises high voltage wires 203, separated from each other by U-shaped channels 204 extending along the tube 101. Furthermore, two guiding plates 205, which are elongated in the longitudinal direction of the tube 101 are preferably provided for guiding the gas flow through discharge gap 106 and a portion of such gas into dedusting unit 202. After exiting dedusting unit 202, the gas returns to fan 201 to be recirculated through the laser 101. A detailed description of a suitable dedusting unit 202 for use in connection with the present invention is provided in a concurrently filed application bearing Ser. No. 09/511,649 which is hereby incorporated by reference. The filing details of this application are provided above.

The ground electrode 105 is preferably carried by, or mounted to, the electrode plate 111 via a plurality of flow guides 209, which will be referred to again later.

Adjacent to the high voltage electrode 104, two pre-ionizers 206 are provided, which serve to pre-ionize the laser gas to ensure greater homogeneity of the gas discharge in the discharge gap 106.

The pre-ionizers 206 are preferably corona-type pre-ionizers and extend substantially parallel to said high voltage electrode. The pre-ionizers 206 have a coaxial shape with a conductive core 207 surrounded by a tube shaped insulator 208.

The corona-type pre-ionizers can be mounted immediately adjacent to the high voltage electrode. In particular, as shown in FIG. 2, the corona-type pre-ionizers should be mounted at the opposing edges of the high voltage electrode so that it is disposed adjacent the electrode face of the high voltage electrode facing the ground electrode.

Although corona-type pre-ionizers are preferred for use as pre-ionizers 206 in connection with the present invention, those skilled in the art will recognize that any of the pre-ionizers known in the art may be used. Furthermore, the insulator of the pre-ionizers is preferably a ceramic material such as alumina. It can also be a fluoride material. Alternatively, any other kind of known pre-ionizer can be used. The pre-ionizers are not necessary for the discharge unit to work. Indeed, excimer lasers were known before the invention of pre-ionizers. Pre-ionization, however makes the gas discharge between the high voltage electrode and the ground electrode more homogeneous and thus more reliable.

Figure 3C:
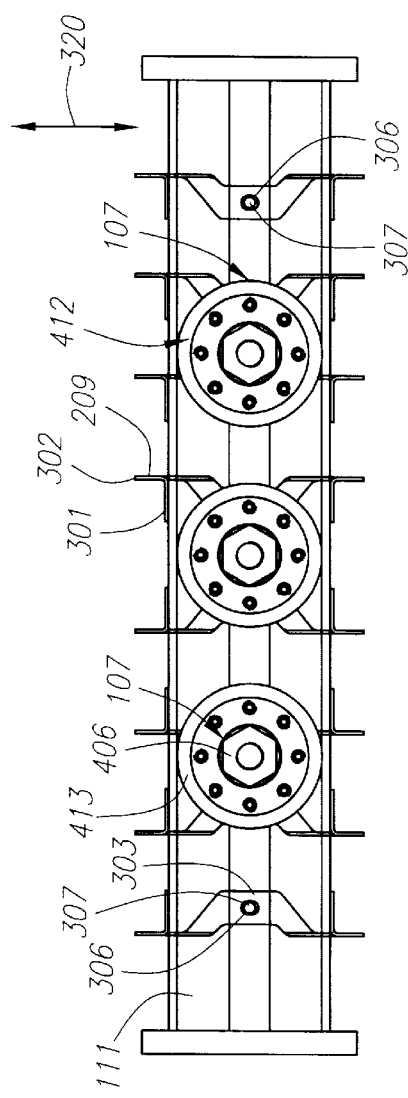

Referring to FIGS. 3a and 3c the discharge unit 102 comprises three coaxial waveguide-like high voltage ducts 107, extending through holes in the electrode plate 111. The ducts 107 are arranged spaced apart from each other. The holes and the ducts 107 have a circular cross section, as can be seen from FIG. 3c. Each of the three ducts 107 is inserted into the respective hole in the electrode plate 111 with a defined tolerance between the insulator element and the hole. As those skilled in the art will appreciate, the number of ducts employed in a particular gas laser 100 will depend on the overall length of the laser.

The ground electrode 105 is preferably carried by, or mounted to, the electrode plate 111. As best seen in FIGS. 2 and 3a, preferably a plurality of flow guides 209 are used for this purpose.

The flow guides 209 are preferably made from sheets of metal that extend between the electrode plate and the ground electrode in a plane perpendicular to the longitudinal axis of the electrodes 104, 105. The flow guides plates 209 comprise respectively an upper flange 301, a lower flange 303, and a central flow-guiding portion 302 integrally connecting said upper flange 301 to said lower flange 303. Said upper and lower flanges 301, 303 extend perpendicular to each other and to said central flow-guiding portion 302. The upper flange 301 is attached to a side face 304 of electrode plate 111, and the lower flange 303 is attached to a bottom face 305 of the ground electrode 105. The central flow-guiding portion 302 is preferably aerodynamically profiled in order to minimize flow resistance and turbulences for maintaining a substantially laminar gas flow between the flow guides.

The lower flange 303 preferably includes an oblong hole 306 (shown only at part of the flow guides 209). Hole 306 is oblong in a direction perpendicular to the longitudinal axis of the elongated ground electrode 105. A screw, or other fastening means, 307 is inserted through the hole 306 into a mating threaded hole 308 being provided in the ground electrode 105. The oblong hole 306 allows for adjustments of the ground electrode 105 with respect to the high voltage electrode 104 essentially in the direction indicated by the double-headed arrow 320 in FIG. 3c.

The upper flange 301 preferably includes an oblong hole 309. Hole 309 being oblong in a direction perpendicular to the longitudinal axis of the electrode plate 111. A screw, or other fastening means, 310 is inserted through the hole 309 into a mating threaded hole 311 being provided in the high voltage electrode 104. The oblong hole 309 allows an adjustment of the ground electrode 105 with respect to the high voltage electrode 104 essentially in the direction indicated by the double-headed arrow 322 in FIG. 3a.

Figure 4:
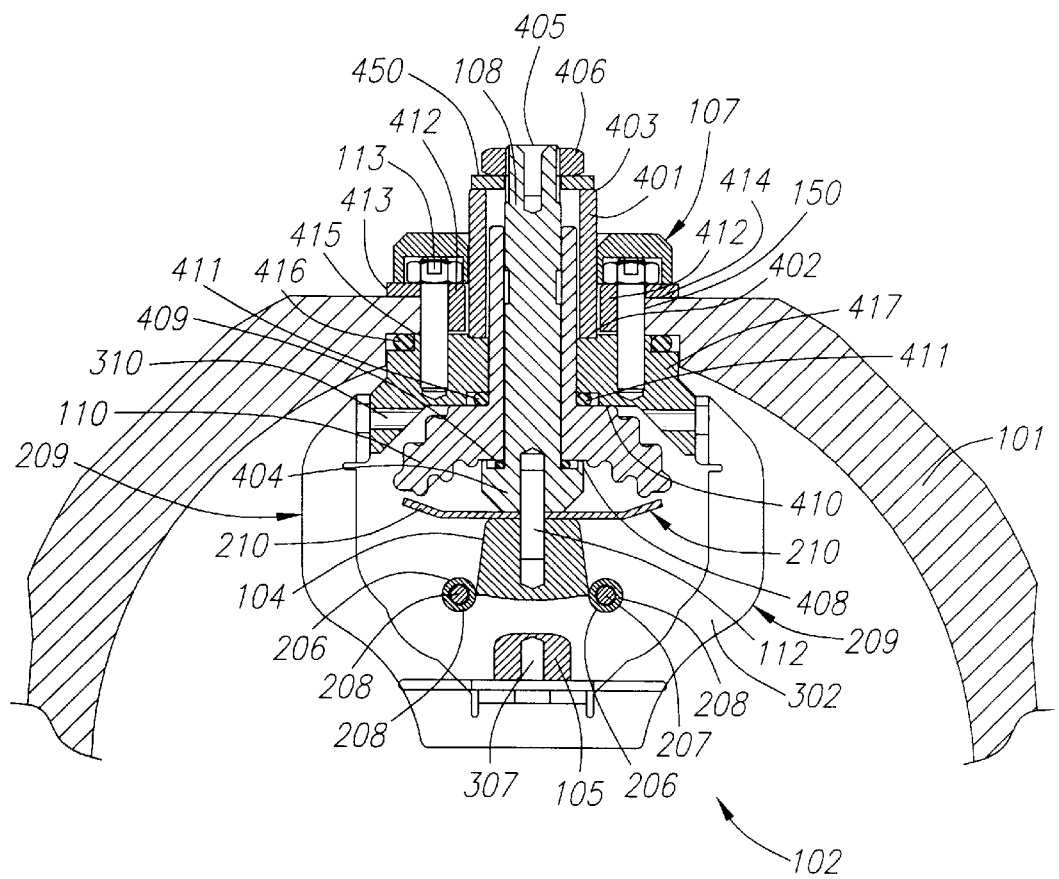
FIG. 4 shows a detailed cross section of the discharge unit according to a preferred embodiment of the invention.

FIG. 4 shows a cross section of the discharge unit 102 according to the preferred embodiment of the invention. In particular, FIG. 4 shows an enlarged cross-sectional view of the discharge unit shown in FIG. 2. The angle of view is the same as in FIG. 3b.

Each high voltage duct 107 of the laser discharge unit 102 preferably further comprises a sleeve 401 enclosing the core 108 and insulator 110. Sleeve 401 has an inner end 402 supported by the electrode plate 111, and an outer free end 403. The core 108 has an inner end 404 connected to the high voltage electrode 104 and a threaded outer free end 405 extending beyond the free end 403 of the sleeve 401. A nut 406 may be screwed onto the threaded end 405 as shown in FIGS. 3c and 4, thereby pressing the sleeve 401 against the electrode plate 111 and tensioning the core 108 by pulling it. Preferably a washer 450 is interposed between nut 406 and sleeve 401 to evenly distribute the stresses applied by nut 406 to sleeve 401. A threaded stud bolt 112 is used to connect the inner end 404 of the core 108 to the high voltage electrode 104.

The inner end 404 of the core 108 is provided with a core ring shoulder 408, which is pressed against the ceramic insulator element 110 when core 108 is placed under tension. A seal 409 is preferably provided between the ring shoulder 408 and the ceramic insulator element 110.

The ceramic insulator element 110 is also caused to be pressed against the electrode plate 111 by means of the tensioned core 108 via the core ring shoulder 408 at the inner end 404 of the core 108. Preferably a ring shoulder 410 is provided on the insulator element 110 and another seal 411 is provided between the ceramic insulator ring shoulder 410 and the electrode plate 111.

To provide additional sealing, a sealing ring 412 (see also FIGS. 2 and 3c) preferably surrounds each sleeve 401. Sealing ring 412 may be constructed to have a flange 413 at its outer circumference. Flange 413 is dimensioned so that it is supported by an outer rim 414 of the holes 150 in the tube 101 through which the respective ducts 107 are inserted. Electrode plate 111 is then preferably provided with a ring shoulder 417 facing an inner rim 415 of the tube 101. A metal seal 416 is preferably interposed between shoulder 417 and rim 415. As a result, when the ring 412 and the electrode plate 111 are connected by screws 113 a gas tight seal is provided between the shoulder 417 and the inner rim 415 of the tube 101.

All of the seals 409, 411 and 416 are ring-shaped metal seals in the present embodiment. However, those skilled in the art will appreciate that the invention is not limited to using ring-shaped seals.

As noted above, the ground electrode 105 is carried by the electrode plate 111 via a plurality of flow guides 209. Flow guides 209 are preferably made from sheets of metal that extend between the electrode plate and the ground electrode in a plane perpendicular to the longitudinal axis of the electrodes. The flow guides comprise an upper flange, a lower flange 303, and a central flow-guiding portion 302 integrally connecting the upper flange 301 to the lower flange. The upper and lower flanges extend perpendicular to each other and to the central flow-guiding portion 302. The upper flange 301 is attached to a side face 304 of the electrode plate 111, and the lower flange 303 is attached to a bottom face of the ground electrode 105. Preferably the central flow-guiding portion 302 is aerodynamically profiled in order to minimize flow resistance and turbulences for maintaining a substantially laminar gas flow in the gas discharge region 106.

As will be understood by one skilled in the art, the invention may be embodied in other specific forms without departing from the spirit and the scope of the invention. The description of the embodiment is given as an illustrative example only and should not be understood as a limitation of the invention, which is set forth in the following claims.

We claim:

1. A gas laser discharge unit, comprising:

an elongated electrode plate having a plurality of spaced-apart holes therein;

a plurality of coaxial high voltage ducts, each duct extending through one of the holes in said electrode plate, each duct comprising a central conductive core and an insulator element being arranged around said core and electrically insulating said core from said electrode plate;

an elongated high voltage electrode electrically connected to said cores of said ducts; and an elongated ground electrode positioned to oppose said high voltage electrode and form a gas discharge gap therebetween, said ground electrode being electrically connected to said electrode plate.

2. The laser discharge unit according to claim 1, wherein said ducts are carried by said electrode plate.

3. The laser discharge unit according to claim 2, wherein each of said ducts are inserted into said electrode plate with a defined tolerance between said insulator element and the respective hole in said electrode plate through which the respective duct is inserted.

4. The laser discharge unit according to claim 3, wherein said ducts and holes have a circular cross section.

5. The laser discharge unit according to claim 2, wherein a gas-tight seal is provided between said ducts and said electrode plate.

6. The laser discharge unit according to claim 4, wherein a gas-tight ring-shaped seal is provided between said ducts and said electrode plate.

7. The laser discharge unit according to claim 6, further comprising:

a sleeve enclosing, each of the cores, said sleeves having an inner end supported by the electrode plate and an outer free end; wherein said cores have an inner end connected to the high voltage electrode and a threaded outer free end extending beyond the free end of the sleeves, and a nut screwed onto the threaded end of each core thereby pressing the sleeves against the electrode plate and tensioning the cores by pulling them.

8. The laser discharge unit according to claim 7, wherein the inner end of the core is provided with a first shoulder and a sealing element is disposed between the first shoulder and the insulator, and wherein the first shoulder of said core is pressed against the insulator by the tensioned core.

9. The laser discharge unit according to claim 8, wherein the insulator includes a second shoulder positioned to oppose the electrode plate, and a second sealing element is disposed between said second shoulder and said electrode plate, and wherein the second shoulder is pressed by means of the tensioned core via the first shoulder.

10. The laser discharge unit according to claim 1, wherein said high voltage electrode is carried by said ducts.

11. The laser discharge unit according to claim 10, wherein said ducts are carried by said electrode plate.

12. The laser discharge unit according to claim 11, wherein each of said ducts are inserted into said electrode plate with a defined tolerance between said insulator element and the respective hole in said electrode plate through which the respective duct is inserted.

13. The laser discharge unit according to claim 12, wherein said ducts and holes have a circular cross section.

14. The laser discharge unit according to claim 10, wherein a gas-tight seal is provided between said ducts and said electrode plate.

15. The laser discharge unit according to claim 12, wherein a gas-tight ring-shaped seal is provided between said ducts and said electrode plate.

16. The laser discharge unit according to claim 10, wherein said ground electrode is carried by said electrode plate.

17. The laser discharge unit according to claim 16, wherein said ducts are carried by said electrode plate.

18. The laser discharge unit according to claim 17, wherein each of said ducts are inserted into said electrode plate with a defined tolerance between said insulator element and the respective hole in said electrode plate through which the respective duct is inserted.

19. The laser discharge unit according to claim 18, wherein said ducts and holes have a circular cross section.

20. The laser discharge unit according to claim 16, wherein a gas-tight seal is provided between said ducts and said electrode plate.

21. The laser discharge unit according to claim 19, wherein a gas-tight ring-shaped seal is provided between said ducts and said electrode plate.

22. The laser discharge unit according to claim 1, wherein said insulator elements are made of a fluoride material.

23. The laser discharge unit according to claim 1, wherein said insulator elements have a shape which conically expands towards said high voltage electrode and comprise a corrugated surface, so as to increase a creepage path extending along said surface.

24. The laser discharge unit according to claim 1, further comprising a first and a second corona pre-ionizer, located adjacent to opposing edges of said high voltage electrode, wherein said corona pre-ionizers comprise a conductive core and a surrounding tube-shaped insulator.

25. The laser discharge unit according to claim 1, which is adapted to be used in an excimer laser.

26. A module-type gas laser, comprising
a tube containing a gas mixture comprising a laser gas;
a discharge unit removably mounted inside said tube, said discharge unit comprising an elongated high voltage electrode and an elongated ground electrode spaced apart from each other so as to generate a gas discharge gap between said two electrodes;
laser gas circulation means disposed within said tube;
a first laser optical element disposed at one end of said discharge gap; and
a second laser optical element disposed at the second end of said discharge gap;
wherein said discharge unit is a module-type discharge unit, such that it is removably mountable into said tube as one integrated unit, and said discharge electrodes are adjustable with respect to each other when said discharge unit is completely removed from said tube.

27. The module-type gas laser according to claim 26, wherein said discharge unit further comprises;
an elongated electrode plate having a plurality of spaced-apart holes therein;
a plurality of coaxial high voltage ducts, each duct extending through one of the holes in said electrode plate, each duct comprising a central conductive core and an insulator element being arranged around said core and electrically insulating said core from said electrode plate; wherein
said ducts are carried by said electrode plate;
said high voltage electrode is electrically connected to said cores of said ducts and said ground electrode is electrically connected to said electrode plate,
said high voltage electrode is carried by said ducts; and
said ground electrode is carried by said electrode plate.

28. The module-type gas laser according to claim 27, wherein each of said ducts are inserted into said electrode plate with a defined tolerance between said insulator element and a respective hole in said electrode plate through which the respective duct is inserted.

29. The module-type gas laser according to claim 28, wherein said ducts and holes have a circular cross section.

30. The module-type gas laser according to claim 27, wherein a gas-tight seal is provided between said ducts and said electrode plate.

31. The module-type gas laser according to claim 29, wherein a gas-tight ring-shaped seal is provided between said ducts and said electrode plate.

32. The module-type gas laser according to claim 31, further comprising:
a sleeve enclosing the core, said sleeve having an inner end supported by the electrode plate and an outer free end; wherein
said cores have an inner end connected to the high voltage electrode and a threaded outer free end extending beyond the free end of the sleeves, and a nut is screwed onto the threaded end of each core thereby pressing the sleeve against the electrode plate and tensioning the cores by pulling them.

33. The module-type gas laser according to claim 32, wherein the inner end of the core is provided with a first shoulder and a sealing element is disposed between the first shoulder and the insulator, and wherein the first shoulder of said core pressed against the insulator by the tensioned core.

34. The module-type gas laser according to claim 34, wherein the insulator includes a second shoulder positioned to oppose the electrode plate, and a second sealing element is disposed between said second shoulder and said electrode plate, and wherein the second shoulder is pressed by means of the tensioned core via the first shoulder.

35. The module-type gas laser of claim 34, wherein a ring surrounds each sleeve, said rings having at their outer circumference a flange that is supported by an outer rim of the holes in the tube through which the respective duct is inserted, and the electrode plate has a mating shoulder supported at an inner rim of the tube of each hole, and wherein said rings and the electrode plate are connected by screws and a third seal element is provided between each mating shoulder of the electrode plate and the inner rim of the tube at each hole.

36. The module-type gas laser according to claim 27, wherein said insulator elements are made of a fluoride material.

37. The module-type gas laser according to claim 27, wherein said insulators have a shape which conically expands towards said high voltage electrode and comprise a corrugated surface, so as to increase a creepage path extending along said surface.

38. The module-type gas laser according to claim 27, further comprising a first and a second corona pre-ionizer, located adjacent to opposing edges of said high voltage electrode, wherein said corona pre-ionizers comprises a conductive core and a surrounding tube-shaped insulator.

39. A laser discharge unit according to claim 1, wherein the gas laser is an excimer laser.

* * * * *